May 30, 1967 — C. R. KING — 3,322,368
FILM-WINDING AND INDICATING CONTROL
Filed March 7, 1966 — 4 Sheets-Sheet 4

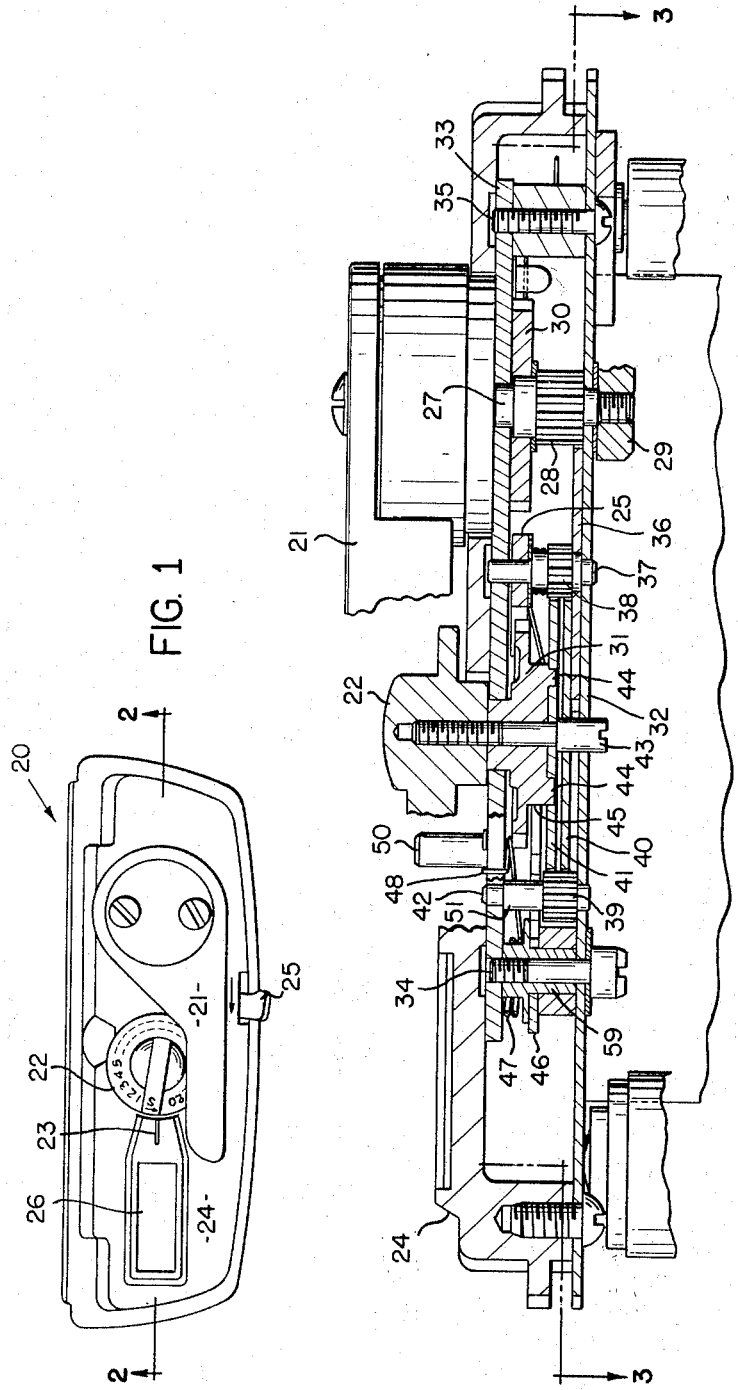

INVENTOR.
CHARLES R. KING
BY
Crumpston & Shaw
ATTORNEYS

United States Patent Office 3,322,368
Patented May 30, 1967

3,322,368
FILM-WINDING AND INDICATING CONTROL
Charles R. King, East Rochester, N.Y., assignor to Graflex, Inc., Rochester, N.Y., a corporation of New York
Filed Mar. 7, 1966, Ser. No. 532,399
9 Claims. (Cl. 242—71.4)

This invention relates to a winding and indicating control for photographic film and more particularly to a device for advancing a film strip and an exposure indicator through a cycle including advancing a leader for the film strip, advancing the film strip through a metered sequence of positions for a succession of exposures, and advancing a trailer for the film strip.

Although the invention is not limited to any particular type of camera or film holder, in its preferred embodiment it is included in a photographic film holder similar to the one disclosed in U.S. Patent No. 2,588,054, issued on Mar. 4, 1952 to Clarence E. Smith. Such holder is adapted to fit the back of a photographic camera for metering and indicating exposures on a film strip along with advancing the leader and trailer for such strip.

A preferred embodiment of the present invention utilizes the basic structure of the roll film holder shown in U.S. Patent No. 2,588,054 and employs a portion of the film advancing mechanism there described. However, the present invention improves upon the previously known film-winding and indicating control.

The film-winding control described in U.S. Patent No. 2,588,054 included an index plate notched for the eight exposures intended on the film strip for which the control was designed, and the inventor suggested that for 12 exposures an index plate having 12 notches could be substituted for the illustrated plate. To increase the number of exposures to 20 or more, it was found that a reasonable-sized index plate could not carry the required 20 or more notches and still meter the leader for the film strip. The present invention solves this problem.

The objects of the invention include, but are not limited to, the following:

(a) Adapting an existing film-winding and indicating control for a greater number of exposures on a longer film strip, by a minimum of change and reconstruction of previous mechanisms; and (b) Providing a simple, compact, economical, and reliable film-winding and indicating control suitable for film strips intended for relatively large numbers of exposures.

These and other objects of the invention will be apparent hereinafter from the specification which describes the invention, its use and operation, and its preferred embodiment, from the drawings, which constitute a part of the disclosure, and from the subject matter claimed.

The preferred embodiment of this invention improves upon a film-winding control such as shown in U.S. Patent No. 2,588,054, by using a pair of superposed counter gears one of which drives the index wheel and the other of which advances independently to meter the leader for the film strip. Means are provided for advancing the counter gear driving the index wheel in the normal manner during the metering of exposure positions for the film strip, and the counter gears are arranged for returning to a predetermined start position for the beginning of each cycle. Preferably, predetermined sectors of missing teeth and a means in addition to the drive gear for advancing the counter gears together are used to accomplish these functions.

Of course, the invention is not limited to 20 or any other particular number of exposures, and it can be embodied in a variety of film-driving mechanism. However, for ease of description, the preferred embodiment of the invention in U.S. Patent No. 2,588,054 will be disclosed, and the inventive differences over the previous holder will be pointed out.

In the drawings:

FIG. 1 is a plan view of the top of the preferred film holder according to the invention showing the film-winding lever and the indicator dial;

FIG. 2 is a section of the holder of FIG. 1 taken along the line 2—2, which line is repeated in FIG. 3;

Figure 3:
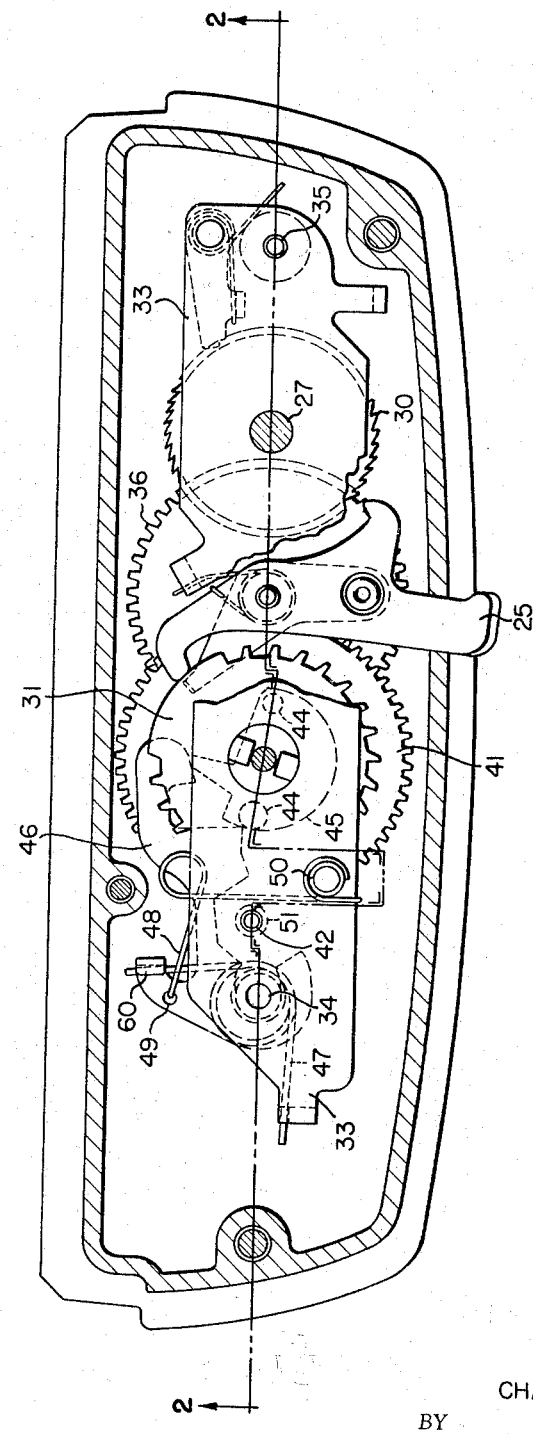
FIG. 3 is a section of the view of FIG. 2 taken along the line 3—3.

The structure of the illustrated preferred embodiment and its relationship with the holder disclosed in U.S. Patent No. 2,588,054 will first be described, and then the action of the inventive control will be traced through a cycle of operation.

FIG. 1 shows the top of holder 20 and illustrates the preferred quick-wind lever 21 and rotatable indicator dial 22. Dial 22 is rotatably driven in the direction of the arrow adjacent the start position (marked S) past mark 23 on cover 24 for indicating the number of exposures on a strip of film within the holder. As illustrated, indicator dial 22 is marked for 20 positions corresponding to 20 exposures of the film strip within the holder. However, the spirit of the invention does not require any particular number of exposures. The manually removable end of lock lever 25 protrudes through an opening in cover 24 for actuation by the camera operator. Surface 26 affords a space for marking the type of film with which the holder is loaded.

FIGS. 2 and 3 illustrate all the structural parts of the preferred embodiment of the invention. Many of the illustrated members function in the same manner as disclosed in U.S. Patent No. 2,588,054, and these will be reviewed briefly.

Winding motion of lever 21 is transmitted to shaft 27 on which gear 28 and ratchet wheel 30 are fixed. Drive key 29 rotates with shaft 27 for advancing the take-up spool (not shown) of the holder.

Gear 28 drives intermediate members of the inventive winding control which move notched index wheel 31. Lock lever 25 rides on the periphery of wheel 31 and falls into successive index notches in wheel 31 and into the teeth of ratchet wheel 30 to stop the winding control for metering exposures of the film strip in the holder in the way described for the similar mechanism of U.S. Patent No. 2,588,054. Indicator dial 22 advances with index wheel 31 during such metering for indicating each successive exposure. The number of notches on index wheel 31 controls the number of exposures on the film strip.

The drive train for the preferred winding control is contained within cover 24 between end plate 32 for holder 30 and mounting plate 33 held spaced from plate 32 by mounting screws 34 and 35. Gear 28 meshes with and drives gear 36 fixed to shaft 37. Pinion 38 is also fixed to shaft 37 and rotates with gear 36. A pair of counter gears 40 and 41 are disposed for meshing with pinion 38 and idler pinion 39 which is freely rotatable with its sleeve 51 on shaft 42. Lower counter gear 40 is freely rotatable about shift 43, and upper counter gear 41 is fixed to index plate 31 as by plate projections 44 extending into apertures in counter gear 41 so that index wheel 31 rotates with upper counter gear 41. In turn, indicator dial 22 is keyed to index wheel 31 for rotation therewith. Sectors of counter gears 40 and 41 are devoid of teeth to accomplish an operation described below.

Below index wheel 31, but preferably integral therewith, is a cam 45 engaged by follower 46. Spring 47 is wrapped around shaft 34 and engages cover plate 33 and ear 60 on follower 46 for biasing the follower into engagement with cam 45. An additional spring 48 has one end anchored in aperture 49 in follower 46 and the other end bent around post 50 which also functions as a stop for winding lever 21. As best shown in FIG. 3, spring 48 increases the bias of follower 46 and lies next to sleeve 51 of idler pinion 39 on shaft 42. As will be described below, spring 48 is disposed for braking idler 39 by selective engagement with sleeve 51 as a function of the position of follower 46.

Figure 4:
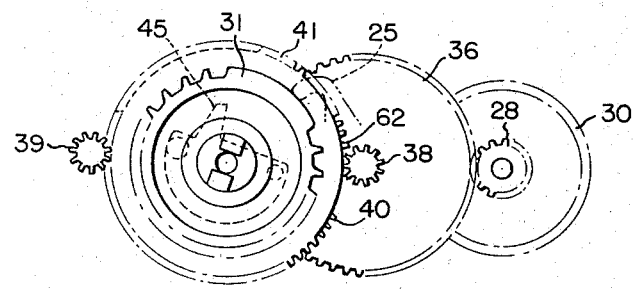
FIG. 4 is a plan view of a portion of the inventive drive train showing the end position for such drive train.

The drive train for the inventive winding control is shown separated from the remainder of the device in FIG. 4. As there illustrated, pinion 28, turning with ratchet wheel 30, drives gear 36 and pinion 38, which, in cooperation with pinion 39, drives counter gears 40 and 41. Such movement advances index wheel 31 and rotates cam 45.

The preferred form for counter gears 40 and 41 is best illustrated in FIGS. 5–8 showing various positions of such counter gears relative to pinions 38 and 39, at various points in a cycle of operation. Counter gear 40 has toothed sectors 52 and 62 and toothless sectors 53 and 63, and counter gear 41 has a toothed sector 54 and a toothless sector 55 preferably as illustrated.

Figure 9:
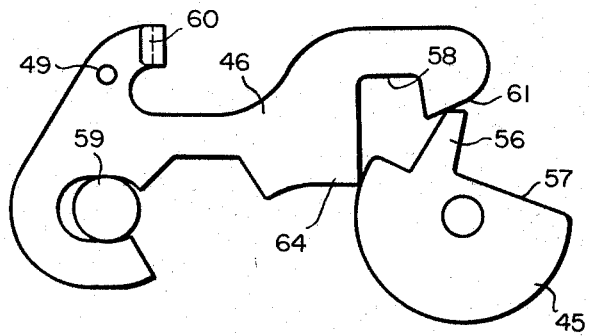
FIGS. 9–11 show plan views of the cam and follower for the inventive control in various positions during a cycle.
Figure 10:
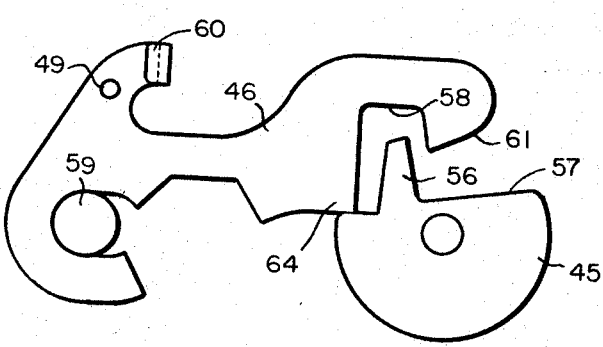
Figure 11:
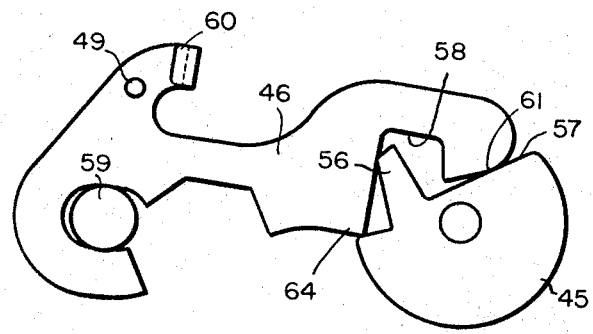

As best shown in FIGS. 9–11, cam 45 preferably is cut with a tooth 56 extending from a generally flat side 57 of the cam periphery. Tooth 56 cooperates with notch 58 in follower 46 as illustrated. Follower 46 is mounted loosely for both pivotal and sliding motion about shaft 59, which is preferably formed as a sleeve around mounting screw 34 (FIG. 2).

Operation

FIG. 4 shows the elements of the winding control drive train in the relative positions assumed at the completion of the winding of a trailer for an exposed roll of film, and removal of the film from the holder. Such position is thus the initial position in which the holder is ready for a new roll of film and a new cycle of operation.

In the initial position, toothless sectors of each of the counter gears 41 and 42 are adjacent drive pinion 38 so that neither counter gear is rotated during winding of the trailer or can be driven until the mechanism is reset. The last tooth of sector 62 of counter gear 40 has just been driven past, and is beyond reach of, pinion 38. Lock lever 25 is resting on the unnotched periphery of index wheel 31.

The relative positions of cam 45 and follower 46 in the initial position is shown in FIG. 9; follower 46 is riding effectively on the normal maximum periphery of cam 45, and is urged back away from cam 45 on its mounting shaft 59. Tooth 56 of cam 45 is approaching notch 58 in follower 46.

At this point, a fresh roll of film is threaded into holder 20, and the leader for the film strip is attached to the take-up spool. The holder is then closed and attached to a camera. Before advancing the leader, indicator dial 22 is manually moved to the reset or start position in which the S is adjacent index mark 23 on cover 24. This requires a small counterclockwise rotation of indicator dial 22 as viewed from the top of holder 20.

The reset rotation of dial 22 moves cam 45 to the position illustrated in FIG. 10 in which notch 58 of follower 46 has fallen over tooth 56. Follower 46 has moved forward on its mounting shaft 59 toward cam 45 and has pivoted in from the periphery toward the axis of cam 45. Also, once notch 58 falls over tooth 56, the heel 64 of follower 46 engages and biases cam 45 counterclockwise to insure full movement of the drive train elements to the reset position.

In addition to moving cam 45 and follower 46, the reset rotation of dial 22 also rotates counter gear 41 a small amount counterclockwise. Because of the mutual engagement of counter gears 40 and 41 with idler pinion 39, counter gear 40 is also rotated a like amount which is sufficient to mesh the first tooth of sector 52 with drive pinion 38.

The movement of follower 46 toward cam 45 as illustrated in FIG. 10 brings spring brake 48 out of engagement with sleeve 51 of idler pinion 39 to leave pinion 39 loosely rotatable on its shaft 42. Taking the brake off pinion 39 prevents any tooth-to-tooth hang up of the first tooth of sector 52 with pinion 38.

Lever 21 is then operated for winding the leader of the film strip onto the take-up spool. Advancement of an initial length of leader causes a further small rotation of index wheel 31, cam 45, and counter gears 40 and 41. Counter gear 40 rotates to the position shown in FIG. 5 in which the teeth of sector 52 have passed idler pinion 39 and toothless sector 53 is adjacent the idler. Counter gear 41 rotates to the position shown in FIG. 6 in which the first tooth of sector 54 is just short of engagement with pinion 38.

Figure 5:
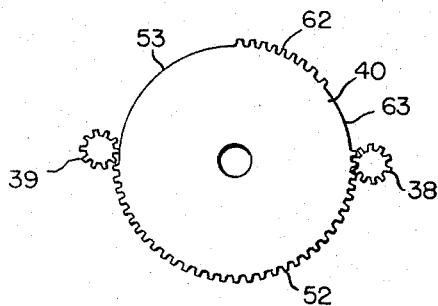
FIGS. 5–8 show plan views of counter gears for the inventive control in various positions during a cycle.
Figure 6:
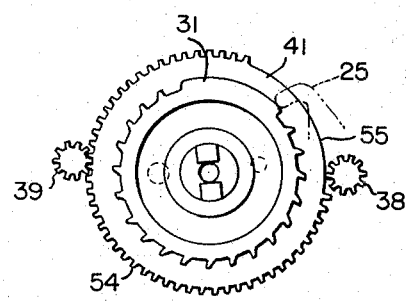

With the counter gears in their respective positions illustrated in FIGS. 5 and 6, counter gear 40 will not drive idler 39 until the first tooth of sector 62 meshes with idler 39. Since idler 39 is not driven, and since counter gear 41 is not in mesh with drive gear 38, counter gear 41 will not rotate until idler 39 rotates.

The initial leader advancement also brings lock lever 25 to the edge of the first exposure notch in index wheel 31 as shown in FIG. 6. Lever 25 is still riding on the unnotched periphery of wheel 31, but is ready to drop into the first notch upon further slight rotation of wheel 31.

This initial leader advancement also moves cam 45 to the position illustrated in FIG. 11 in which tooth 56 is pressed against a wall of notch 58. This has moved follower 46 back on its loose mounting on shaft 59 away from cam 45 sufficiently to bring brake 48 into frictional engagement with sleeve 51 on idler pinion 39. With the brake 48 thus applied to idler 39, counter gear 41 is held from accidental and undesired rotation. Furthermore, the relative positions of follower 46 and cam 45 as illustrated in FIG. 11 offer maximum braking force against any further rotation of index wheel 31 or counter gear 41 to help in holding these members in position until the leader is fully taken up. Such braking force results not only from tooth 56 pressing against the wall of notch 58, but from the toe 61 of follower 46 pressing against the flat portion 57 of cam 45 on the opposite side of the cam axis from heel 64, to substantially remove any rotational bias of cam 45 by follower 46.

Figure 7:
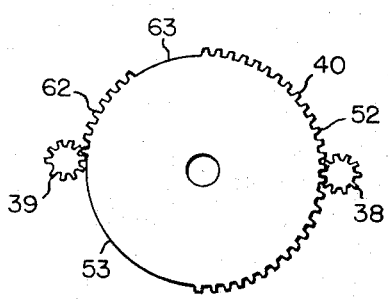
Figure 8:
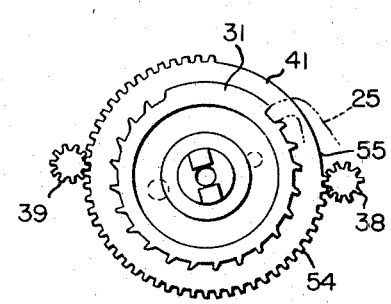

As the rest of the leader is wound on the take-up spool, index wheel 31, cam 45, follower 46, and counter gear 41 all remain motionless, and counter gear 40 alone is rotated by drive pinion 38. As the leader is completely taken up and film is advanced into the area for exposure of a first frame, the first tooth of sector 62 of counter gear 40 meshes with idler pinion 39 as shown in FIG. 7 and rotates idler 39 against the force of brake 47 to rotate both counter gears together. Such rotation meshes the first tooth of sector 54 of counter gear 41 with drive pinion 38, and rotates index wheel 31 sufficiently for lock lever 25 to drop into the first exposure notch as illustrated in FIG. 8. This stops further motion of the winding control, and the film strip is positioned for exposure of a first frame.

After the first exposure, lock lever 25 is manually moved from its notch to release the winding control for advancement, and lever 21 is operated to drive the film strip into position for exposure of a second frame. Such driving of the film strip also drives counter gears 40 and 41 together, rotates cam 45 against follower 46, and rotates index wheel 31 until lock lever 25 falls into the second notch. The rotation is repeated as a sequence of exposures is made on the film strip, and as the rotation proceeds, follower 46 is forced to the uncut periphery of cam 45.

During the film advancement, toothless sector 53 of counter gear 40 is advanced into registry with drive pinion 38, and at the same time, toothless sector 55 of counter gear 41 moves into registry with idler pinion 39. During such condition, counter gear 40 is not rotated because it is not in mesh with drive pinion 38, and idler pinion 39 is not rotated by counter gear 41. Also, at such times the brake 48 is on pinion 39 because follower 45 is pushed back on its shaft 59 by the uncut periphery of cam 45. Since counter gear 40 is in mesh with idler 39, this braking force helps hold counter gear 40 motionless while toothless sector 55 of counter gear 41 is driven past idler 39. The rotational advancement of counter gear 41 while counter gear 40 is held motionless restores the initial starting relationship for the counter gears so that they will be disposed in the proper respective positions for commencement of a new cycle.

When the toothed sector 54 of counter gear 41 meshes with idler pinion 39, it rotates the idler and drives counter gear 40 along with counter gear 41. Counter gears 40 and 41 are then driven together through the remainder of the exposure cycle.

After the last exposure is made, lock lever 25 is moved from the last notch in index wheel 31 onto the unnotched sector of such wheel. Then as the trailer for the film strip is taken up, sectors 63 and 55 of counter gears 40 and 41 respectively register with drive pinion 38 to stop further advancement of the counter gears. This position is then the initial position illustrated in FIG. 4 from which a new cycle of operation can be run as described above.

Thus, the invention accomplishes its objects and realizes the advantages of simplicity, reliability, economy, compactness, and minimum modification of existing holders. Counter gears 40 and 41, and their associated pinions 38 and 39, need not be expensive or precision made to function reliably as intended. The invention thus affords a simple modification of a winding control for a greater number of exposures.

Other features, advantages, and other specific embodiments of this invention will be apparent to those exercising ordinary skill in the pertinent art after considering the foregoing disclosure. In this regard, while specific preferred embodiments of my invention have been described in considerable detail, such disclosure is intended as illustrative, rather than limiting, and other embodiments, variations, and modifications can be effected within the spirit and scope of the invention as disclosed and claimed.

I claim:

1. In a device for advancing a leader for photographic roll film and advancing said film through a metered sequence of positions for a succession of exposures, said device including a rotatable indicator for said exposures, and a mechanism for driving said film and said indicator, and wherein said drive mechanism includes a drive gear, a driven index wheel with which said indicator is rotated, a lock lever cooperating with said index wheel for stopping said drive mechanism in successive positions corresponding to said sequence of film positions, a cam rotated with said index wheel, and a follower for said cam, the improvement comprising:

(a) a pair of superposed counter gears, the teeth of each of which are disposed for meshing with said drive gear, and predetermined sectors of each of which are toothless;
(b) means for rotating said cam and said index wheel with a first one of said counter gears;
(c) means for rotating said counter gears together through a predetermined rotation during which said teeth of only one of said counter gears are in mesh with said drive gear;
(d) means for disposing said counter gears in respective starting positions for each roll of said film;
(e) said second counter gear being advanceable from its starting position independently of said first counter gear through an initial predetermined rotation corresponding to said advancement of said leader; and
(f) said rotating means being arranged for advancing said first counter gear with said second counter gear during a terminal portion of said initial predetermined rotation of said second counter gear to a position from which said first counter gear is advanceable through said successive positions.

2. The device of claim 1 wherein said rotating means comprises an idler gear disposed for meshing with toothed sectors of each of said counter gears.

3. The device of claim 2 wherein said cam and follower are respectively configured to prevent rotation of said first counter gear while said second counter gear is advanced through said initial predetermined rotation.

4. The device of claim 2 wherein in said starting position, said first counter gear is disposed a relatively small angle of rotation short of a position in which said lock lever will stop said drive mechanism for exposure of a first frame of said film strip.

5. The device of claim 2 including means for braking said idler gear during predetermined portions of each cycle.

6. The device of claim 5 wherein said braking means comprises a spring anchored on said follower and braking said idler gear as a function of the position of said follower.

7. The device of claim 6 wherein said cam and follower are respectively configured to prevent rotation of said first counter gear during said initial predetermined rotation.

8. The device of claim 7 wherein said braking means is on during a portion of each cycle in which a toothed portion of said second counter gear is meshed with said idler gear, and said second counter gear is not in mesh with said driving gear.

9. The device of claim 1 including means for holding said second counter gear from advancement during a predetermined advancement of said first counter gear.

References Cited

UNITED STATES PATENTS 2,588,054   3/1952   Smith _____ 242—71.4

FRANK J. COHEN, *Primary Examiner.*

N. L. MINTZ, *Assistant Examiner.*